US009830342B2

(12) United States Patent
Dolph et al.

(10) Patent No.: US 9,830,342 B2
(45) Date of Patent: Nov. 28, 2017

(54) OPTIMIZING DATABASE DEDUPLICATION

(71) Applicant: International Business Machines Corporation, Armonk, NY (US)

(72) Inventors: Blaine H. Dolph, Western Springs, IL (US); Nataraj Nagaratnam, Cary, NC (US); Sandeep R. Patil, Pune (IN); Riyazahamad M. Shiraguppi, Pune (IN)

(73) Assignee: International Business Machines Corporation, Armonk, NY (US)

( * ) Notice: Subject to any disclaimer, the term of this patent is extended or adjusted under 35 U.S.C. 154(b) by 464 days.

(21) Appl. No.: 14/548,401

(22) Filed: Nov. 20, 2014

(65) Prior Publication Data

US 2016/0147797 A1    May 26, 2016

(51) Int. Cl.
*G06F 17/30*    (2006.01)
(52) U.S. Cl.
CPC .. *G06F 17/30303* (2013.01); *G06F 17/30371* (2013.01)
(58) Field of Classification Search
CPC .............. G06F 17/30303; G06F 17/30371
See application file for complete search history.

(56) References Cited

U.S. PATENT DOCUMENTS

| 8,463,825 | B1 * | 6/2013 | Harty | G06F 17/30233 |
| | | | | 707/813 |
| 9,183,200 | B1 * | 11/2015 | Liu | G06F 17/30008 |
| 9,529,545 | B1 * | 12/2016 | Bono | G06F 3/0641 |
| 2012/0084268 | A1 * | 4/2012 | Vijayan | G06F 3/0652 |
| | | | | 707/692 |
| 2012/0250857 | A1 | 10/2012 | Bosson | |
| 2012/0278569 | A1 * | 11/2012 | Kawakami | G06F 3/0608 |
| | | | | 711/162 |
| 2013/0144840 | A1 | 6/2013 | Anglin et al. | |
| 2013/0268499 | A1 | 10/2013 | Kirihata et al. | |
| 2014/0059018 | A1 | 2/2014 | Fienblit et al. | |
| 2016/0162509 | A1 * | 6/2016 | Berrington | G06F 17/30159 |
| | | | | 707/639 |

OTHER PUBLICATIONS

International Sear Report with Written Opinion, International application No. PCT/IB2015/058557, filing date: Feb. 18, 2016, 12 pages.

(Continued)

*Primary Examiner* — Jay Morrison
(74) *Attorney, Agent, or Firm* — Schmeiser, Olsen & Watts, LLP; Michael Petrocelli (57) ABSTRACT

A method and associated systems for optimized deduplication of a database stored on multiple tiers of storage devices. A database-deduplication system, upon receiving a request to update a database record, uses memory-resident logs and previously generated database-maintenance tables to identify a first logical block that identifies an updated value, stored in a first physical block of storage, to be used to update a database record and to further identify a second logical block that stores in the database a corresponding existing value of the same record. After determining that the first and second logical blocks reside within the same storage tier, the system directs a deduplication module to associate both logical blocks with the first physical block.

20 Claims, 5 Drawing Sheets

(56) References Cited

OTHER PUBLICATIONS ip.com, Method for identifying Image Objects with Similiar Intent from Multiple Documents to aid Block Level De-duplication in storage clouds, IP.com No. IPCOM000210334D, IP.com Electronic Publication: Aug. 30, 2011, 8 pages.

ip.com, Method for copy operation performance improvement in multi-user storage environment, IP.com No. IPCOM000230946D, IP.com Electronic Publication: Sep. 19, 2013, 8 pages.

\* cited by examiner

| Logical Block | Access Count | Tier |
|---|---|---|
| L100 | 1000 | I (SSD) |
| L101 | 1001 | I (SSD) |
| L102 | 300 | II (HDD) |
| L103 | 400 | II (HDD) |
| L104 | 600 | II (HDD) |
| L200 | 1200 | I (SSD) |
| L201 | 1300 | I (SSD) |
| L202 | 100 | II (HDD) |
| L203 | 200 | II (HDD) |

TABLE I: Multi-Tier Information Table

| Physical Block | Status | Hash Value | Referring Logical Blocks |
|---|---|---|---|
| P000 | Allocated | 1123da12e34 | LB100 |
| P010 | Allocated | 345b5689dac | LB120, LB180 |
| P020 | Allocated | 678456ecfba | LB140 |
| P030 | Freed | | |
| P040 | Allocated | 37891654abc | LB160 |
| P050 | Freed | | |

TABLE II: Deduplication Table

FIG. 5

OPTIMIZING DATABASE DEDUPLICATION

TECHNICAL FIELD

The present invention relates to managing data stored on a multi-tier set of physical storage devices by a data-management system that comprises a deduplicating function.

BACKGROUND

A user-updatable data-storage application, such as a database-management system (DBMS), may store data on multiple storage devices, each of which is associated with a storage tier.

A DBMS application may comprise a database-server component that organizes stored data into records. Each record identifies data that is organized into a set of blocks. The database sees such a record as a set of "logical" blocks, and each logical block refers to a corresponding "physical" block of storage on a physical storage device. In one example, if a first record of a database identifies a first collection of data, the corresponding database-server application may organize that data into two logical blocks, L100 and L200. Logical block L100 may, in turn, identify data that is physically stored on a hard disk as physical block P100, and logical block L200 may similarly identify data physically stored on a hard disk as physical block P200.

This method of mapping logical to physical blocks is known to those skilled in the art as a way to increase efficiency, flexibility, or reliability of storage management. One way in which such a mechanism may improve storage efficiency is by enabling or facilitating a "deduplication" function, which may be performed by a "deduplication engine" module of a database-management system.

Deduplication is a process by which duplicate, redundant, or otherwise unnecessary blocks of storage may be eliminated. If, for example, a logical block L100 and a logical block L101 both identify the same set of data values, a deduplication engine may ensure that the identified data is stored on physical media only one time. In such a case, if the data is stored in physical block P100, then L100 and L101 might both point to the same physical block P100.

A database-management system determines that two logical blocks point to a same set of data values by comparing "hash values" computed for the contents of each of the two logical blocks. A hash value is a numerical value that is computed by performing a mathematical "hash" function upon a data element. A hash function is generally a complex mathematical computation, such as a high-order polynomial function, and is selected such that no two different data elements can produce identical has values. Conversely, if performing a properly selected hash function upon two different data elements produces two identical hash values, then the two data elements may be assumed to be identical.

Hash values have great value in computer science because computers may be able to store, read, and compare two numeric values more quickly than they could compare a pair of potentially lengthy data elements identified by those hash values. Embodiments of the present invention may thus use hashing techniques in order to efficiently determine whether two logical blocks, or of two physical blocks, contain identical contents.

As is known to those skilled in the art, a database-management system may be based on an architecture that contains elements stored in either primary storage (such as computer memory) and secondary storage (such as a rotating disk drive or an SSD solid-state storage device). For purposes of readability, this document will refer to primary-storage components as "memory-resident" and will refer to secondary-storage components as "on-disk" structures. But readers should not construe these conventions to imply that embodiments of the present invention store data exclusively in computer memory and on disk drives.

Figure 1:
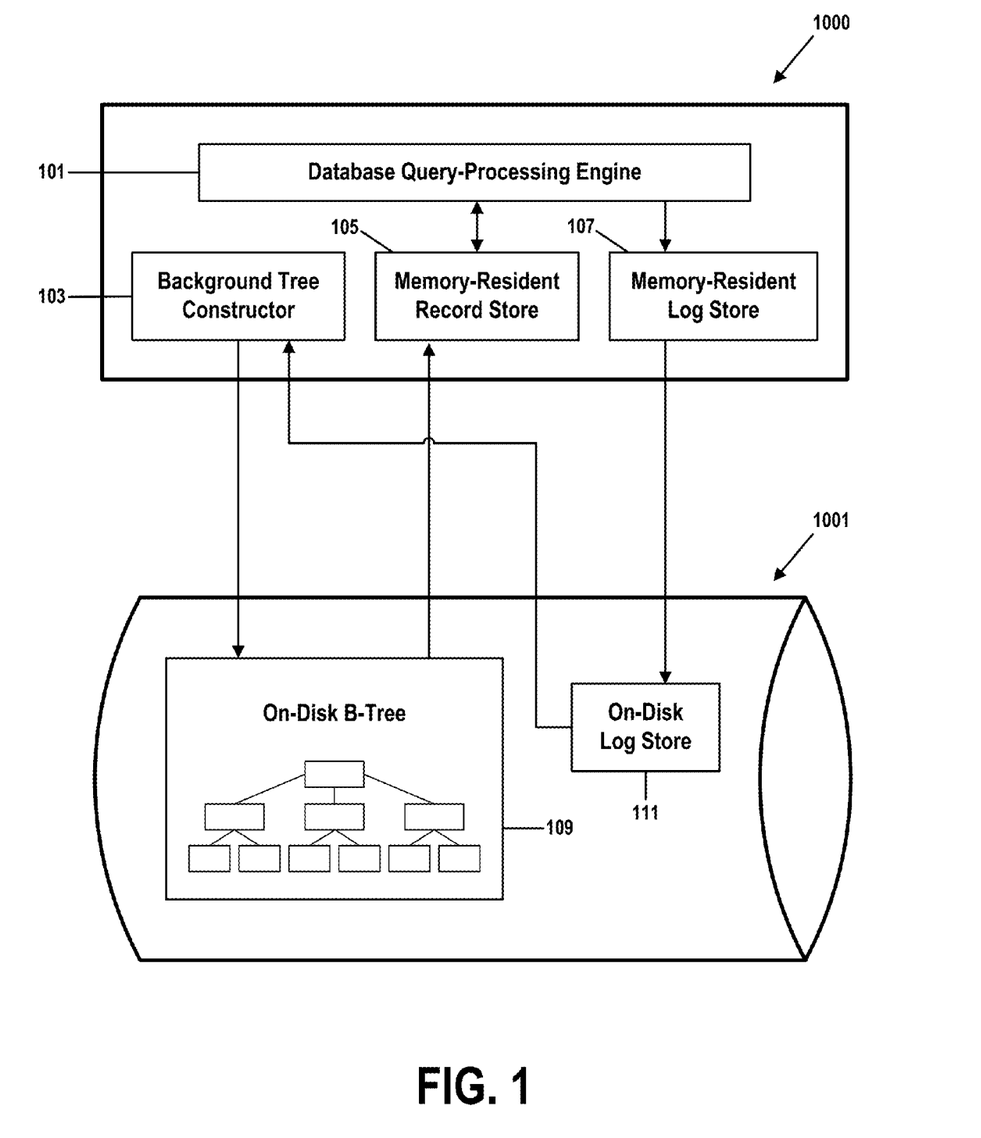
FIG. 1 illustrates a structure of a database-management system, as is known to those skilled in the art of computerized data storage.

FIG. 1 illustrates a structure of a database-management system, as is known to those skilled in the art of computerized data storage. FIG. 1 comprises reference numerals 1000-1001 and 101-111.

The database application of FIG. 1 comprises a set of memory-resident modules 1000 that are normally stored in a computer's primary storage, such as random-access memory or a cache, and a set of on-disk data structures 1001 that are normally stored in secondary storage, such as a rotating disk drive, a solid-state storage device (SSD), or rewriteable optical memory.

Although the exact components of a database-management system may vary, memory-resident modules of a typical system may comprise:

- a Database Query-Processing Engine 101, which manages the database applications processing of user queries;
- a Background Tree Constructor 103, which the application runs in the background in order to determine how an internal structure, stored data, or file system of the database should be updated, internally reorganized, or otherwise revised in order to implement a requested database transaction.
- a Memory-Resident Record Store 105 that caches recently used database information, such as a recently retrieved database record or a database index that was recently accessed while processing a user query;
- a Memory-Resident Log Store 107 that stores a log of database transactions in memory until the application is able to flush the log to the On-Disk Log Store; and Similarly, on-disk data structures of a typical database-management system may comprise:

- an On-Disk B-Tree 109, which comprises the actual structured data of the database. As described above, this data may be organized into records, which are in turn organized into logical blocks, each of which points to data physically stored in a corresponding physical block. The stored data is logically organized into a "B-tree" data structure, which is an optimized version of a binary tree in which a node may be linked to more than two children; and
- an On-Disk Log Store 111, which stores on disk a log of database transactions forwarded from the Memory-Resident Log Store.

One example of how such an application might work comprises the following steps:

- a new user query or transaction is received and initially processed by the Query or transaction-Processing Engine 101.
- If the query or transaction requires a particular database record, the Query or transaction-Processing Engine 101 first checks the Memory-Resident Record Store 105 to determine whether that record was accessed recently enough to still be stored in the Memory-Resident Record Store 105. If so, the Query or transaction-Processing Engine 101 fetches the record from the Memory-Resident Record Store 105, thus avoiding a much-slower retrieval from disk. During the performance of these operations, the Query or transaction-Processing Engine 101 may refer to the On-Disk B-Tree 109 one or more times in order to better identify the operations necessary in order to respond to the user query or transaction.

If the record is not in the Memory-Resident Record Store 105, then the Query or transaction-Processing Engine 101 retrieves the record from the on-disk database 109 and saves it in the Memory-Resident Record Store 105. When the Memory-Resident Record Store 105 fills, the oldest records in the Store 105 are deleted to make room for more recently fetched records, according to a FIFO procedure.

The Query or transaction-Processing Engine 101 also saves, in the Memory-Resident Log Store 107, a log of any database updates necessitated by the query or transaction. These logged updates will be periodically flushed from the Memory-Resident Log Store 107 to the On-Disk Log Store 111.

The Background Tree Constructor 103 determines how to implement the database updates requested by the user query or transaction. This determination may comprise reading an entry from the Memory-Resident Log Store 107 or the On-Disk Log Store 111, where that entry identifies one or more database transactions associated with the user query or transaction. Implementing the query or transaction is generally performed by revising elements of the On-Disk B-Tree 109, such as updating data stored in a record, updating a value of a pointer, index, or key, adding a new record to the database, moving a record, or deleting an existing record from the database.

After the Background Tree Constructor 103 reads the log entry from the Memory-Resident Log Store 107 or the On-Disk Log Store 111, the entry is no longer needed and is deleted from its store 107 or 111.

Once the Background Tree Constructor 103 has determined in memory how the On-Disk B-Tree 109 should be altered in response to the user query or transaction, those alterations are actually performed upon the On-Disk B-Tree 109.

During the course of such operations, two or more logical blocks of the On-Disk B-Tree 109 may identify identical data, as indicated when the two or more logical blocks are found to each identify data that is associated with the same hash value. Storage and management of a database may be made more efficient by eliminating such redundancies. One way to do so, as is known to those skilled in the art, is to associate each of the two or more logical blocks with a same block of physical storage, rather than allocating a distinct, duplicate physical block to each logical block.

Eliminating redundant physical storage in this manner may be performed by a software application known as a deduplication engine. Such an engine may detect duplicate copies of stored data and delete all but one of the associated identical physical blocks. The engine then points each of the logical blocks to the single remaining physical block.

A deduplication engine configured between a database-application server and a physical storage device may detect each attempt by the database application to store redundant data in a new logical block, where that data is identical to that of an existing logical block. If no deduplication function exists, the database application would allocate a new physical block to store data identical to that already stored in the existing physical block. But here, the deduplication engine instead saves storage space by associating the new logical block with a physical block already associated with the existing logical block.

In one example, consider a database that contains two records, R100 and R200. R100 stores data identified by logical blocks L100 and L101, which respectively store data in physical blocks P100 and P101; and 8200 stores data identified by logical blocks L200 and L201, which respectively store data in physical blocks P200 and P201.

If a user transaction updates record R100 such that its logical block L100 is updated to identify data identical to that of record R200's logical block L200, then there is no longer any need to store the contents of logical block L100 and logical block L200 in two distinct physical blocks. By computing and comparing hash values of each logical block, the deduplication engine determines that the contents of L100 and L200 are identical and thus, rather than allocating a distinct physical block of storage to L100, instead updates L100 to point to physical block P200. In this way, the contents of two logical blocks (L100 and L200) may be stored in a single physical block.

A database-management application may store data on multiple storage devices, and these devices may be organized into tiers, based on criteria such as frequency of access, frequency of update, access-time requirements, criticality, security level, or data-recovery requirements. Data that is frequently accessed, for example, by an application that requires a quick response time might be stored on one or more "Tier One" high-speed solid-state drives. Other data that is less frequency accessed, or is accessed exclusively by applications that are more tolerant of longer access times, may instead be stored on less-expensive, higher capacity "Tier Two" rotating hard disk drives. Data that is rarely accessed, that is not expected to be updated, or that is very old might be stored on archival "Tier Three" storage, such as optical disc.

A selection of which classes of storage devices are associated with each tier may be implementation-dependent, and in some embodiments, a database system may store data in more than three or in less than three tiers.

A choice of tier in which a physical block of data is stored has implications for an operation of a deduplication engine. Consider, for example, two logical blocks that would normally be associated with data stored in different tiers. If those two logical blocks identify identical data, deduplicating the redundant physical storage—and thus forcing the two logical blocks to identify data in a same tier—may have an adverse effect on system performance, efficiency, or reliability.

Tiers, and allocation of physical blocks to specific tiers, may be managed by a "relocator" module that determines which physical blocks should be stored in each storage tier. A relocator, for example, may store physical blocks that identify "hot" data (data that is accessed or revised with frequency that exceeds a threshold value) in a first tier of fast SSD storage devices, while relegating other physical blocks to a second tier of slower storage devices.

In another example, if a relocator module detects that a physical block stored in a fast SSD tier is no longer accessed frequently, it may move that physical block to a slower tier. In some database implementations, a relocator module of a database-management application, or of a storage-management application or platform, works continuously to scan physical blocks of stored data and relocate them as necessary to improve performance. In some embodiments, a relocator might, after a reorganization of a B-tree 109 by a Background Tree Constructor 103, determine whether the reorganization has resulted in a condition in which a physical block should be moved to a storage device of a different tier.

In one example, a deduplication module might respond to a requested database transaction by steps similar to those listed below. Here, an existing database record R100 might be identified in the Memory-Resident Log Store 107 as comprising logical blocks L100 and L101, and a new, updated, copy of the record will comprise logical blocks L200 and L201. Assuming that L100 and L101 are associated with the same storage tier as L200 and L201, the database-update/deduplication procedure might comprise the steps:

i) Identify from the Memory-Resident Log Store 107 that the data currently identified by record R100 in the On-Disk B-Tree 109 is identified by logical blocks L100 and L101.

ii) Allocate unused blocks L200 and L201 to store data of the updated record. In this example, L200 and L201, as mentioned above, are chosen from the same storage tier as blocks L100 and L101.

iii) Read data stored in physical blocks P100 and P101, which are identified by the existing record's logical blocks L100 and L101.

iv) Copy, in memory, existing data read from P100 and P101 to newly allocated logical blocks L200 and L201.

v) Flush data associated with logical blocks L200 and L201 to physical blocks P200 and P201.

vi) The deduplicator module determines that logical blocks L100 and L200 are now associated with data elements that have identical hash values, and that logical blocks L101 and L201 are now associated with data elements that have identical hash values.

vii) The deduplicator deduces, from these hash values, that physical blocks P100 and P200, associated respectively with logical blocks L100 and L200, store identical data, and that physical blocks P101 and P201, associated respectively with logical blocks L101 and L201, store identical data The deduplicator eliminates the redundant storage by pointing logical blocks L100 and L200 to the same P100 physical block, and by pointing logical blocks L101 and L201 to the same P101 physical block. Physical blocks P200 and P201 are now free to be used for other storage purposes.

In practice, this procedure effectively reduces database storage requirements, but it also introduces inefficiencies and overhead by requiring unnecessary data transfers in memory and with physical storage. Such inefficiencies and overhead may in particular degrade a performance of a Background Tree Constructor 103 as it attempts to determine how best to update an On-Disk B-Tree 109 in response to a requested database transaction.

In the preceding procedure, for example:

Reading the contents of a database record's logical blocks from physical storage is a high-latency operation that, even if performed as a background operation, may significant degrade performance. This is especially true if the physical storage device is a shared resource.

Some deduplication procedures may require an updated record's to be read from the On-Disk Log Store 111, requiring yet another high-overhead physical-storage access.

Copying data between logical blocks, even if done in memory, wastes processor power and memory capacity.

Complex hash value calculation and comparison adds overhead that is unnecessary if a database-management application already knows that a new logical block (such as L200, in the above example) comprises data identical to that of the block (such as L100) from which it was copied. In other words, conventional deduplication procedures force a deduplication module to perform unnecessary, higher-overhead operations in order to determine whether two logical blocks or two physical blocks contain identical data, even if the database-management application already knows this to be true.

Embodiments of the present invention streamline these procedures by eliminating a need for such transfers, and thereby significantly improve an efficiency of a deduplication procedure.

This document describes embodiments of the present invention and associated examples that comprise steps of deduplicating physical blocks of storage that might be associated with two or more logical blocks associated with a same tier. This simplification exists solely to improve readability and should not be construed to limit embodiments of the present invention to operation within a single tier. In embodiments that are otherwise similar to those described here, a method of the present invention may be used to enhance systems that deduplicate redundant blocks stored in different storage tiers.

BRIEF SUMMARY

A first embodiment of the present invention provides A database-deduplication optimizer comprising one or more processors, one or more memories coupled to the one or more processors, and one or more computer-readable hardware storage devices coupled to the one or more processors, wherein one or more of the computer-readable hardware storage devices contains program code configured to be run by one or more of the processors via one or more of the memories to implement a method for optimizing deduplication of a database that is stored on a set of database storage devices organized into two or more tiers, the method comprising:

the database-deduplication optimizer retrieving a transaction request from a database log, wherein the transaction request identifies: an existing record stored in the database; a type of transaction to be performed upon the existing record; and an updated data value to be written to the existing record;

the database-deduplication optimizer, in response to the retrieving, identifying a first logical block that corresponds to a first physical block and that stores the updated data value identified by the transaction request;

the database-deduplication optimizer further identifying a second logical block that stores, on a storage device of the set of database storage devices, an existing data value comprised by the existing record; and the database-deduplication optimizer directing a deduplication module to associate the first logical block and the second logical block with a same physical block.

A second embodiment of the present invention provides a method for optimizing deduplication of a database that is stored on a set of database storage devices organized into two or more tiers, the method comprising:

a database-deduplication optimizer retrieving a transaction request from a database log, wherein the transaction request identifies: an existing record stored in the database; a type of transaction to be performed upon the existing record; and an updated data value to be written to the existing record;

the database-deduplication optimizer, in response to the retrieving, identifying a first logical block that corresponds to a first physical block and that stores the updated data value identified by the transaction request;

the database-deduplication optimizer further identifying a second logical block that stores, on a storage device of the set of database storage devices, an existing data value comprised by the existing record; and the database-deduplication optimizer directing a deduplication module to associate the first logical block and the second logical block with a same physical block.

A third embodiment of the present invention provides a computer program product, comprising a computer-readable hardware storage device having a computer-readable program code stored therein, said program code configured to be executed by a processor of a computer system to implement a method for optimizing deduplication of a database that is stored on a set of database storage devices organized into two or more tiers, the method comprising:

a database-deduplication optimizer retrieving a transaction request from a database log, wherein the transaction request identifies: an existing record stored in the database; a type of transaction to be performed upon the existing record; and an updated data value to be written to the existing record;

the database-deduplication optimizer, in response to the retrieving, identifying a first logical block that corresponds to a first physical block and that stores the updated data value identified by the transaction request;

the database-deduplication optimizer further identifying a second logical block that stores, on a storage device of the set of database storage devices, an existing data value comprised by the existing record; and the database-deduplication optimizer directing a deduplication module to associate the first logical block and the second logical block with the first physical block.

DETAILED DESCRIPTION

Embodiments of the present invention address inefficiencies and unnecessary overhead of known methods of deduplication of data stored in a database system or other type of information repository. In some embodiments, including those described below, these advantages accrue only when deduplicating blocks of physical storage that are associated with a same storage tier. In other embodiments, however, such advantages may accrue even when an embodiment comprises a procedure of deduplicating blocks of stored data that are associated with different tiers of physical storage devices.

As described above, known methods of deduplication comprise inefficiencies associated with unnecessary or redundant: physical-storage I/O, memory-resident data-processing, copying data to a B-tree from a log store, and a computation or comparison of hash values of data identified by logical or physical blocks. As will be described by the below figures, embodiments of the present invention eliminate a need for some or all of these high-overhead steps.

In particular, embodiments of the present invention take advantage of the fact that, while implementing certain database transactions, such as those described in examples above, a database-management application knows that a newly created or allocated logical block identifies data identical to that identified by an existing block. In such cases, rather than requiring a series of hashing operations, in-memory data-processing procedures, and high-overhead storage accesses, the deduplicator receives notice from other components of the database-management application that a deduplication step should be taken. In such cases, the deduplication module can proceed immediately—possibly even while the Background Tree Constructor 103 is still identifying a revised B-tree—to eliminate potential creation of a redundant physical block without performing unnecessary disk I/O or hashing operations.

In a variation of this approach, if the Background Tree Constructor 103, during a procedure of revising a B-tree in response to a database-update request, determines that two logical blocks identify identical data, then the Background Tree Constructor 103 may inform other components of the database-management application that two logical blocks may point to a same physical block of storage. In such a case, it might not be necessary to require an analysis by a standard deduplication module.

Other variations are possible, in which various modules of a database-management system, upon identifying that two logical blocks identify identical data, initiate steps that result in both logical blocks pointing to a same physical block. Regardless of the details, these embodiments share a feature that a deduplication process occurs without requiring the hashing or I/O operations of a deduplication module described above.

In one simple example, an embodiment of the present invention might initiate a deduplication procedure by means of the following steps:

i) a user updates data stored by a "USER1" database record from a value of "XYZ" to a value of "PQR."

ii) the database-management system responds by logging a database transaction in a memory-resident log store 107. Such a transaction might generate a transactional log entry similar to:
   <UPDATE, USER1, "PQR"> iii) although the transaction has been recorded in the log, it has not yet been implemented. The database 109 still stores "existing" value "XYZ" on disk until a Background Tree Constructor 103 module of the database manager updates the stored disk value to the "updated" value "PQR."

iv) Once that update occurs, two distinct sets of logical blocks—one set comprised by the transaction record of the log and the other comprised by the disk-based record in database 109—both identify identical data "PQR." Each set of logical blocks identifies distinct blocks of physical storage, resulting in data "PQR" being stored on disk twice.

v) In traditional methods of deduplication, a deduplication engine, while scanning, will identify this redundancy and will point both logical blocks to a single physical block. But this procedure requires resource-intensive disk I/O, data comparisons, and the performance of complex hashing functions. Embodiments of the present invention, however, take advantage of the fact that other modules of the database-management system, while performing their normal operations, are already capable of identifying redundant blocks as candidates for deduplication. The present invention thus provides a mechanism by which these other modules may identify the redundant data to the deduplicating engine, allowing it to eliminate the redundant storage without significant overhead.

The figures and descriptions below describe in greater detail various embodiments of the present invention that implement this approach in order to allow a database-management system, or other type of information repository, to operate more efficiently. In particular, certain embodiments further incorporate steps that extend these methods to information-management systems that organize storage media into distinct tiers, based on usage patterns and other characteristics of stored data.

Figure 2:
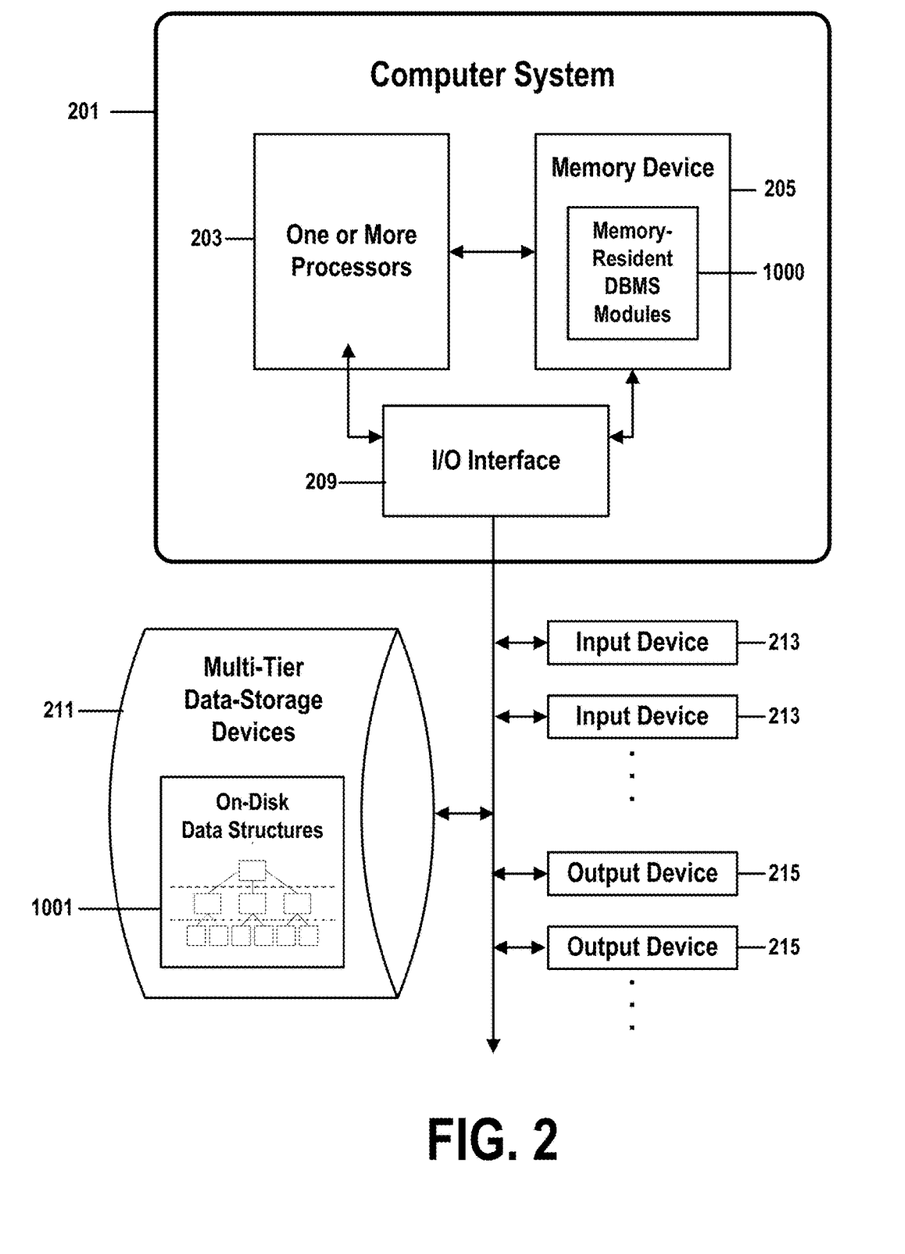
FIG. 2 shows a structure of a computerized database-deduplication system that may be used to implement a method for optimizing database deduplication in accordance with embodiments of the present invention.

FIG. 2 shows a structure of a computerized database-deduplication system that may be used to implement a method for optimizing database deduplication in accordance with embodiments of the present invention. FIG. 2 refers to objects 1000, 1001, and 201-215.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In FIG. 2, computer system 201 comprises a processor 203 coupled through one or more I/O Interfaces 209 to one or more hardware data storage devices 211 and one or more I/O devices 213 and 215. In embodiments of the present invention data storage devices 211 comprises a multi-tiered set of data-storage devices. Such multi-tiered devices 211 may be organized, as described above, into tiers as a function of characteristics of data stored on each such device or as a function of a characteristic of a manner in which each stored element of data is accessed.

In one example, a multi-tiered set of data-storage devices 211 might comprise:
- a first set of Tier One devices that comprise high-speed storage, such as solid-state devices, buffered high-speed rotating disk, or cache, used to store data that must be retrieved quickly or that is revised frequently;
- a second set of Tier Two devices for less critical or less dynamic data, which may comprise slower rotating disks, rewritable optical media, or other medium-speed storage devices; and
- a third set of Tier Three devices that store static or infrequently accessed data, such as read-only media or archival storage libraries.

As described above and in FIG. 1, embodiments of the present invention a set of multi-tiered data-storage devices 211 may store a physical copy of a database, as described in FIG. 1 as comprising On-Disk Data Structures 1001. These structures 1001, under control of the one or more processors 203 and of program code comprised by memory-resident DBMS modules 1000, may comprise a physical copy of the database, as represented by the On-Disk B-Tree 109 and On-Disk Log Store 111 described in FIG. 1.

Hardware data storage devices 211 may thus include, but are not limited to, magnetic tape drives, fixed or removable hard disks, optical discs, storage-equipped mobile devices, and solid-state random-access or read-only storage devices. I/O devices may comprise, but are not limited to: input devices 213, such as keyboards, scanners, handheld telecommunications devices, touch-sensitive displays, tablets, biometric readers, joysticks, trackballs, or computer mice; and output devices 215, which may comprise, but are not limited to printers, plotters, tablets, mobile telephones, displays, or sound-producing devices. Data storage devices 211, input devices 213, and output devices 215 may be located either locally or at remote sites from which they are connected to I/O Interface 209 through a network interface.

Processor 203 may also be connected to one or more memory devices 205, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 205 contains stored computer program code that comprises computer-executable instructions. The stored computer program code includes a program that implements a method for optimizing database deduplication in accordance with embodiments of the present invention, and may implement other embodiments described in this specification, including the methods illustrated in FIGS. 1-5.

In particular, the stored program code comprises the memory-resident modules 1000 described in FIG. 1. These modules 1000 comprise functions that receive, analyze, and process user queries and other requests to implement a database transaction. In some embodiments, the memory-resident modules 1000 may further comprise a deduplication module, as described above.

The memory-resident modules 1000 and other computer program code loaded into one or more memory devices 205 are configured to be executed by processor 203 via the memory devices 205.

Thus the present invention discloses a process for supporting computer infrastructure, integrating, hosting, maintaining, and deploying computer-readable code into the computer system 201, wherein the code in combination with the computer system 201 is capable of performing a method for optimizing database deduplication.

Any of the components of the present invention could be created, integrated, hosted, maintained, deployed, managed, serviced, supported, etc. by a service provider who offers to facilitate a method for optimizing database deduplication. Thus the present invention discloses a process for deploying or integrating computing infrastructure, comprising integrating computer-readable code into the computer system 201, wherein the code in combination with the computer system 201 is capable of performing a method for optimizing database deduplication.

One or more data storage units 211 (or one or more additional memory devices not shown in FIG. 2) may be used as a computer-readable hardware storage device having a computer-readable program embodied therein and/or having other data stored therein, wherein the computer-readable program comprises stored computer program code 1000. Generally, a computer program product (or, alternatively, an article of manufacture) of computer system 201 may comprise said computer-readable hardware storage device 211.

While it is understood that program code 1000 for optimizing database deduplication may be deployed by manually loading the program code 1000 directly into client, server, and proxy computers (not shown) by loading the program code 1000 into a computer-readable storage medium (e.g., computer data storage device 211), program code 1000 may also be automatically or semi-automatically deployed into computer system 201 by sending program code 1000 to a central server (e.g., computer system 201) or to a group of central servers. Program code 1000 may then be downloaded into client computers (not shown) that will execute program code 1000.

Alternatively, program code 1000 may be sent directly to the client computer via e-mail. Program code 1000 may then either be detached to a directory on the client computer or loaded into a directory on the client computer by an e-mail option that selects a program that detaches program code 1000 into the directory.

Another alternative is to send program code 1000 directly to a directory on the client computer hard drive. If proxy servers are configured, the process selects the proxy server code, determines on which computers to place the proxy servers' code, transmits the proxy server code, and then installs the proxy server code on the proxy computer. Program code 1000 is then transmitted to the proxy server and stored on the proxy server.

In one embodiment, program code 1000 for optimizing database deduplication is integrated into a client, server and network environment by providing for program code 1000 to coexist with software applications (not shown), operating systems (not shown) and network operating systems software (not shown) and then installing program code 1000 on the clients and servers in the environment where program code 1000 will function.

The first step of the aforementioned integration of code included in program code 1000 is to identify any software on the clients and servers, including the network operating system (not shown), where program code 1000 will be deployed that are required by program code 1000 or that work in conjunction with program code 1000. This identified software includes the network operating system, where the network operating system comprises software that enhances a basic operating system by adding networking features. Next, the software applications and version numbers are identified and compared to a list of software applications and correct version numbers that have been tested to work with program code 1000. A software application that is missing or that does not match a correct version number is upgraded to the correct version.

A program instruction that passes parameters from program code 1000 to a software application is checked to ensure that the instruction's parameter list matches a parameter list required by the program code 1000. Conversely, a parameter passed by the software application to program code 1000 is checked to ensure that the parameter matches a parameter required by program code 1000. The client and server operating systems, including the network operating systems, are identified and compared to a list of operating systems, version numbers, and network software programs that have been tested to work with program code 1000. An operating system, version number, or network software program that does not match an entry of the list of tested operating systems and version numbers is upgraded to the listed level on the client computers and upgraded to the listed level on the server computers.

After ensuring that the software, where program code 1000 is to be deployed, is at a correct version level that has been tested to work with program code 1000, the integration is completed by installing program code 1000 on the clients and servers.

Embodiments of the present invention may be implemented as a method performed by a processor of a computer system, as a computer program product, as a computer system, or as a processor-performed process or service for supporting computer infrastructure.

Figure 3:
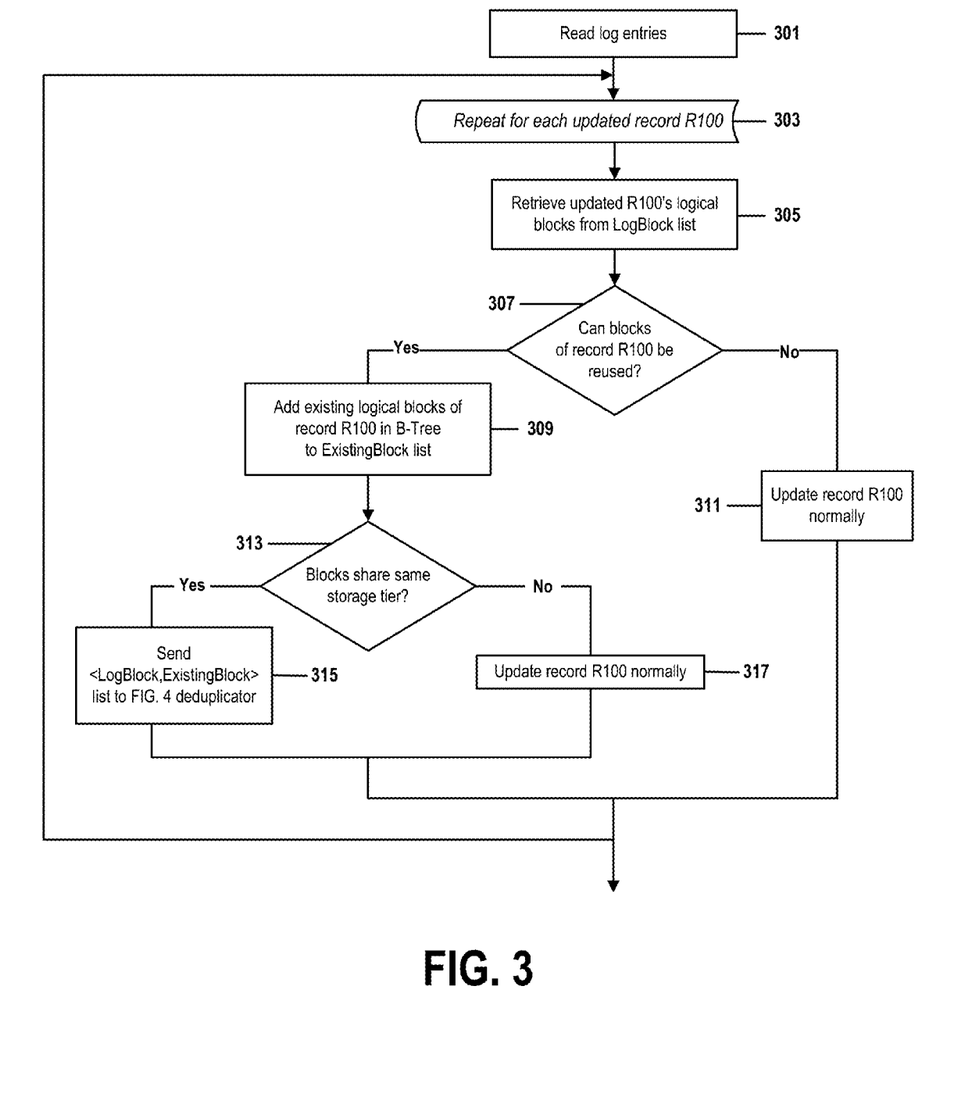
FIG. 3 is a flow chart that illustrates a method for optimizing database deduplication in accordance with embodiments of the present invention.
Figure 4:
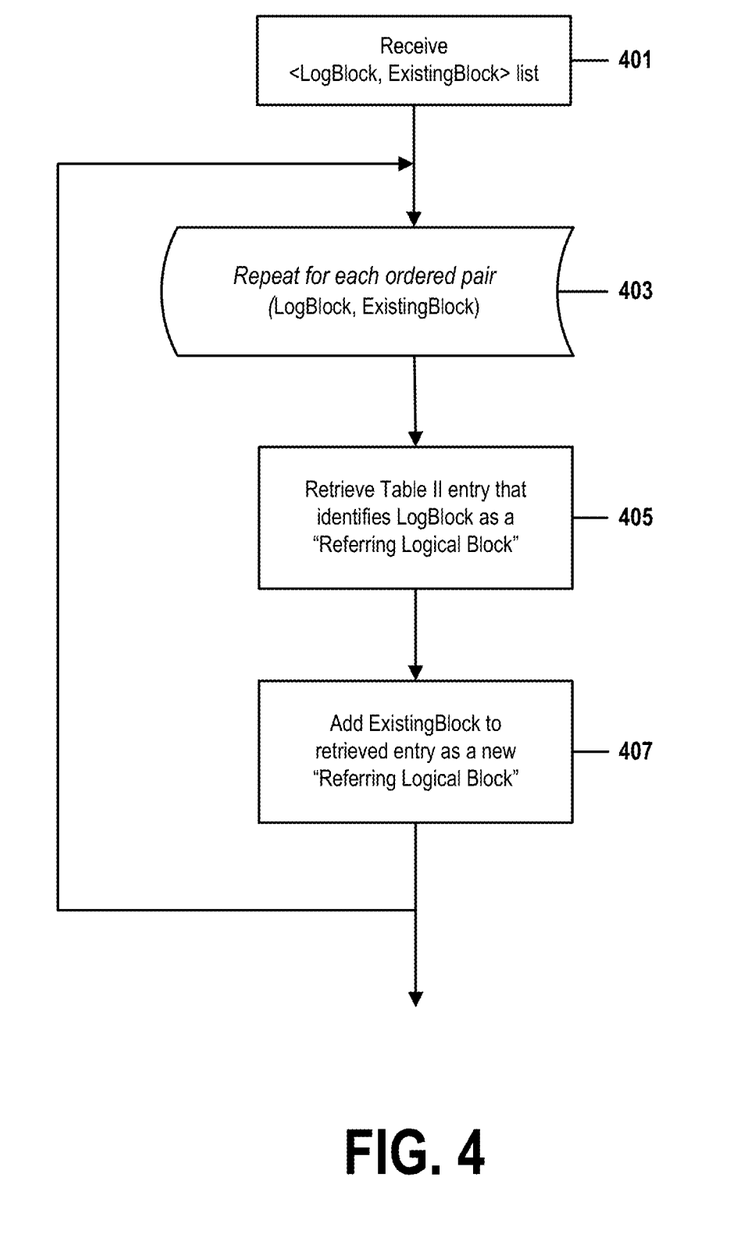
FIG. 4 shows details of steps of FIG. 3 that perform an optimized deduplication procedure in accordance with embodiments of the present invention.
Figure 5:
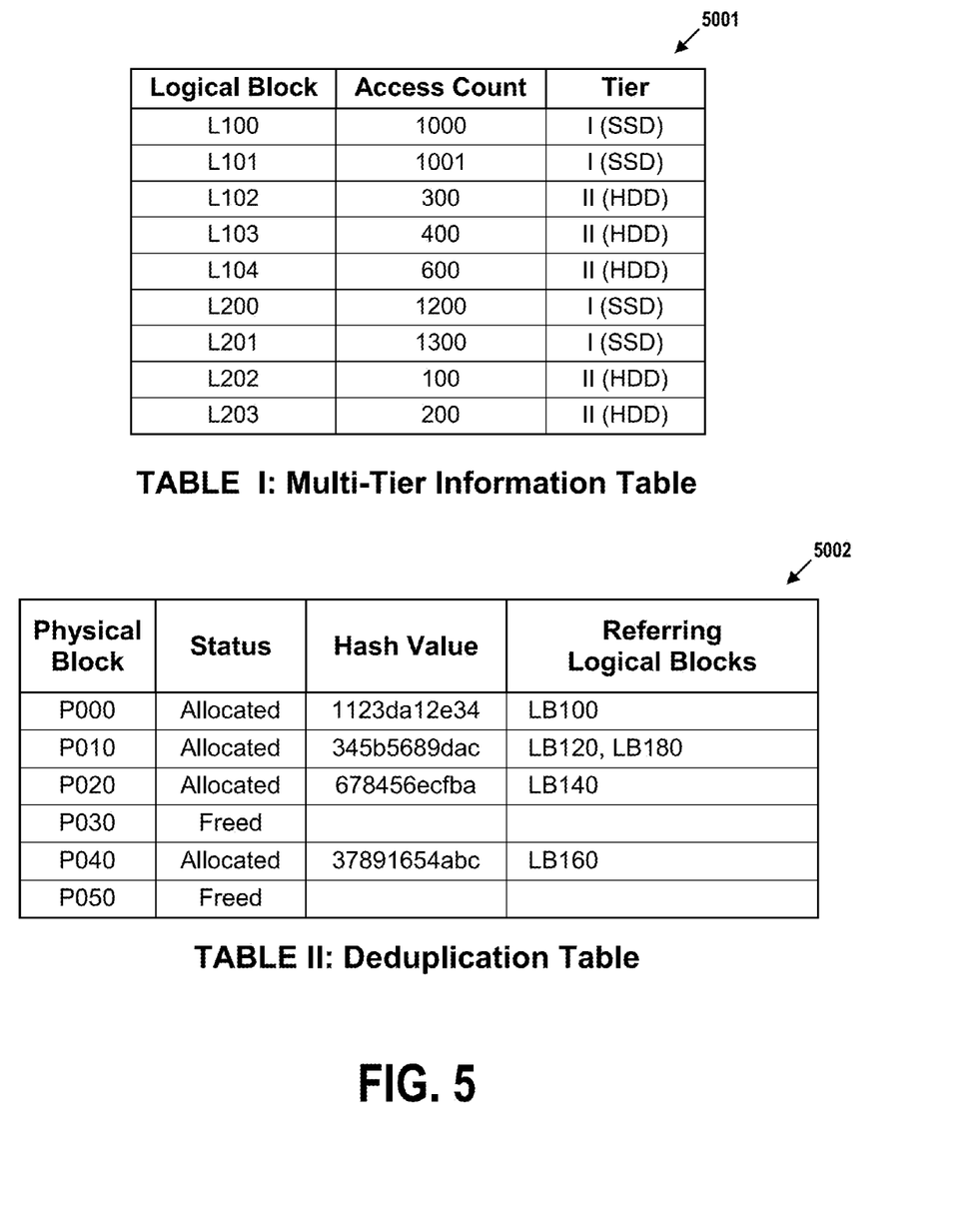
FIG. 5 shows examples of data tables that may be used by embodiments of the present invention to optimize deduplication of a database or of an other type of information repository.

FIGS. 3-5 illustrate a method for optimizing database deduplication, in accordance with the present invention, and demonstrate the present invention's technical advantages over the prior art.

FIG. 3 is a flow chart that illustrates a method for optimizing database deduplication in accordance with embodiments of the present invention. FIG. 3 comprises steps 301-317.

FIG. 4 shows details of steps of FIG. 3 that perform an optimized deduplication procedure in response to step 317 of FIG. 3, in accordance with embodiments of the present invention. FIG. 4 comprises steps 401-417.

FIG. 5 shows examples of data tables that may be used by a database-management system to optimize database deduplication, in accordance with embodiments of the present invention. FIG. 5 comprises steps 5001 and 5002.

The method of FIG. 3 is performed as a function of data stored by the database-management system in two storage-management tables. FIG. 5 shows an example of these tables, labeled TABLE I 5001 and TABLE II 5002.

Table I 5001, also referred to here as a Multi-Tier Information Table, identifies a storage tier associated with each logical block used by the database-management system. In FIG. 5, for example, Table I identifies that logical block L100 identifies data stored on a Tier I (high-speed solid-state) storage device and that logical block L202 identifies data stored on a Tier II (lower-speed hard disk drive) storage device.

The organization of storage devices into tiers, and criteria by which logical blocks are associated with a particular tier, may be implementation-dependent. But in all cases, components of the database-management system will refer to a table similar to Table I 5001 whenever it needs to determine which storage tier is associated with a specific logical block.

In some embodiments, Table I may further identify other attributes of each logical block, as required by a particular implementation. In FIG. 5, for example, Table I also includes an "Access Count" column, which identifies a value associated with each logical block that identifies a relative frequency at which the block is accessed or updated. Such a value may be associated with a storage tier of a corresponding logical block in implementations wherein blocks are assigned to tiers as a function of how often the blocks are accessed or updated. In particular, the Background Tree Constructor will refer to this table in step 315 of FIG. 3 when determining whether a pair of blocks to be deduplicated occupy a same tier.

Table II 5002, also referred to here as a Deduplication Table, contains an entry for each physical disk block that identifies characteristics of that block. In the example of FIG. 5, Deduplication Table 5002 identifies whether each block is free to be associated with a logical block or has already been allocated to one or more logical blocks. If already allocated, the table 5002 further lists the logical blocks associated with the physical block.

In some embodiments, a Deduplication Table 5002 may further list a hash value of data stored in a corresponding physical block. As described above, a hash value is a numeric entity that uniquely identifies a data value and that is generated by performing a complex mathematical operation upon the data value. If contents of two distinct physical blocks generate identical has values, then the database-management system assumes that the two blocks store identical data. In some embodiments, either or both of Table I 5000 and Table II 5002 may further comprise other information.

As will be described in greater detail below, if a database-management system attempts to update a logical block L100, a deduplication module or other component of the system will compute a hash value for the updated value to be written to the block. If that computed hash value matches a hash value of a physical block P100 already enumerated in Table II 5002, then logical block L100 may be added to the Table II entry for P100 and no new physical block will be associated with logical block L100.

If, however, the deduplicator determines that no existing entry of Table II identifies a hash value matching that of the updated logical block L100, then L100 will be added to a Table II entry for an as-yet-unallocated physical block. In this latter case, the system may then store the updated data of logical block L100 in the newly allocated physical block.

Similarly, if a database-management system receives a request to read contents of a logical block L101, the system will refer to the Deduplication table 5002 in order to identify a physical block that stores data associated with logical block L101. The system will then direct the physical storage device controller to return data stored in that associated physical block.

The method of FIG. 3 also refers to two lists of logical blocks maintained by the database-management system to organize, access, or update data stored in the database:
- a LogBlock list enumerates each logical block associated with an updated value of a database record that has been updated in response to a user request or other transaction. These enumerated logical blocks are each associated with the updated record, as it is stored in the Memory-Resident Log Store 107, until the updated value of that record is physically written to the database B-Tree 109 by the Background Tree Constructor 103; and
- an ExistingBlock list identifies logical blocks that will store data comprised by the updated record when it is stored in the B-Tree 109.

The exemplary embodiments of FIG. 3 and FIG. 4 also rely upon certain implementation-dependent assumptions, but these reliances should not be construed to limit all embodiments of the present invention to such assumptions. For example, the embodiments of FIG. 3 and FIG. 4 presume that a storage capacity or size of a database record is never less than that of a single logical block. They also rely upon an assumption that boundaries of each database record are aligned with boundaries of logical blocks—that is, that each database record comprises one or more complete logical blocks.

In other variations, an embodiment may comprise database records that comprise more than one complete logical block; or, if an embodiment allows a record to comprise a partial logical block, additional steps may be required in methods analogous to those of FIG. 3 or FIG. 4 in order to ensure that records, logical blocks, and physical blocks are properly aligned in order to achieve a goal of the present invention.

The method of FIG. 3 begins, in step 301, with a component of the database-management system reading entries of the Memory-Resident Log Store 107. Each entry identifies a database transaction, such as a request to update a value of a database record or a request to add, delete, or copy a record. In examples described herein, the system reads a log entry that identifies an updated value of a database record R100.

In some embodiments, the system may instead read entries from the On-Disk Log Store 111, or may read entries from both Log Stores 107 and 111.

Step 303 starts an iterative procedure of steps 303-317, which repeats once for each record updated by a log entry read in step 301. For pedagogical purposes, we refer to a record being currently processed by a current iteration of the iterative procedure as record "R100," but this should not be construed to imply that a distinct record R100 is processed more than once. If, for example, three records are updated by a log entry read in step 301, the iterative procedure of steps 303-317 would be performed once for each of those three records.

In step 305, the system identifies those logical blocks comprised by the updated value of current record R100, as the updated value is represented in the Log Store 107 (or 111). This list of logical blocks may be read from the LogBlock list, described above, that is maintained by the database-management system.

In some embodiments, the database-management system will also, in this step, ensure that a boundary of the updated record R100 aligns properly with a boundary of the logical blocks read from the LogBlock list. If, for example, the set of logical blocks comprises 2048 Kbytes of data, but record R100 cannot exceed 1024 Kbytes in size, the system might in this step return an error and halt further processing of the method of FIG. 3, or of the current iteration of steps 303-317.

In step 307, the system retrieves and evaluates a list of "existing" logical blocks associated with the existing version of record R100 stored in the On-Disk B-Tree database 109. In some embodiments, this list of existing logical blocks may be read from the ExistingBlock list described above. Because the ExistingBlock list is stored in memory, this component of step 307 may be performed without the overhead of methods that require accessing secondary storage.

In other embodiments, however, including those described in this figure, this list of existing blocks is read instead from tables of a file system, index, or other data structure of the On-Disk B-Tree 109. Because these logical block listings are likely to be accessed frequently, in many implementations, they are stored in high-speed media, such as a disk cache or solid-state storage device. Thus, even if an embodiment must perform a disk-I/O operation in order to complete this step, that I/O operation may not create an unacceptable amount of overhead.

If these existing logical blocks—those blocks that had previously been allocated to the existing, pre-update, version of record R100 stored in the B-Tree database 109—can be reused by the Background Tree Constructor 103 when updating record R100 in the B-Tree 109, the method of FIG. 3 continues with steps 309-317. If the logical blocks cannot be reused in this way, then the method of FIG. 3 continues instead with step 311, which performs a conventional, higher-overhead record-update procedure.

The database-management system in step 307 determines whether the existing logical blocks may be reused by comparing those logical blocks (retrieved in this step from the On-Disk B-Tree 109 or from the memory-resident ExistingBlock list) to the logical blocks associated with the updated version of record R100 (retrieved in step 305 from the memory-resident LogBlock list). If a size or storage capacity of the existing blocks is not at least equal to the size or storage capacity of the updated blocks, then the updated data of record R100, as identified by the Log Store 107 (or 111), cannot be stored in the existing blocks and this iteration of steps 303-317 concludes with the conventional, higher-overhead record-update procedure of step 311.

If the system determines in step 307 that the blocks are large enough to store data of the updated record R100, and satisfy any other implementation-dependent conditions for reuse, then the system proceeds with step 309.

In step 309, the system adds the list of existing logical blocks identified in step 307 to an entry of the ExistingBlock list. This entry, if it did not already do so, now identifies logical blocks currently used to store record R100 in the B-Tree database 109.

In step 313, the database-management system compares entries in the Multi-Tier Information Table 5000 to determine whether each logical block of the updated value of record R100 (now enumerated in the LogBlock list) resides in a same storage tier as a corresponding logical block of the existing version of record R100 (added to the ExistingBlock list in step 309).

If this comparison reveals that a corresponding pair of an updated LogBlock logical block and an existing ExistingBlock logical block occupy a same storage tier, then that LogBlock logical block is updated and considered for deduplication by means of step 315 and of the method of FIG. 4.

If, however, the comparison reveals that a pair of corresponding updated and existing logical blocks occupy different storage tiers, then that logical block is updated, and possibly considered for deduplication at a later time, by conventional means in step 317.

In embodiments, steps 313-317 evaluate each updated/existing pair of logical blocks sequentially. In such cases, some logical blocks of record R100 may be updated, and possibly deduplicated, by means of step 315 and the method of FIG. 4, while others may be updated, and possibly deduplicated by conventional means, as described above and as performed by step 317.

In other implementations, all logical blocks of a record R100 may, by definition, be stored in a same tier because a selection of a logical block's storage tier may be a function of a characteristic of an entire record. That is, in such implementations, it might not be possible to exceed record-level granularity when determining a logical block's storage tier.

In such cases, the determination of step 313 would be performed once for a record R100 in its entirety, and all logical blocks of that record would be updated by a same procedure. As described above, that procedure may comprise either step 314 and the method of FIG. 4, or may comprise a conventional procedure of step 317.

In step 315, having determined that a corresponding pair of updated and existing logical blocks associated with record R100 is capable of being deduplicated by methods of the present invention, the database-management system identifies that pair of logical blocks to a deduplicator module for processing by means of a method of FIG. 4.

In some embodiments, all corresponding pairs of logical blocks are forwarded to the deduplicator in step 315 as a list of ordered pairs of the form<LogBlock[ ], ExistingBlock[ ]>, where each ordered pair identifies a logical block of the updated record R100 culled from a log store in step 305 and a corresponding existing block of R100 in B-Tree 109 identified in step 307. In such cases, the deduplicator will receive a list of such updated-block/existing block pairs in step 401 of FIG. 4.

The determination that an updated/existing pair of logical blocks should be forwarded to the deduplicator may be a function of implementation-dependent factors. These factors may comprise, but are not limited to:

a determination that the existing block has sufficient storage capacity to store an updated data element identified by a log entry read in step 301;
 a determination that all existing blocks, in aggregate, identified by entries of the ExistingBlock list associated with record R100 have sufficient storage capacity to store the updated R100 data identified by the log entry read in step 301; or
 a determination that both logical blocks of the updated/existing pair of R100 logical blocks are associated with a same storage tier or identify physical blocks of storage that reside in a same storage tier.

In step 401 of FIG. 4 a deduplication module, in accordance with embodiments of the present invention, receives one or more ordered pairs of logical blocks generated by the database-management system in step 315 of FIG. 3. Each of these ordered pairs identifies a logical block of a database record scheduled to be updated as a function of an entry of Memory-Resident Log Store 107 (or On-Disk Log Store 111) and a corresponding logical block of the current, existing version of same database record stored in the On-Disk B-Tree database 109.

Unlike conventional methods of deduplication, this ordered pair has been, in compliance with methods of the present invention, identified by a module of the database-management system other than the deduplication module. This identification, as described above, was accomplished here without requiring redundant data copying between logical blocks or unnecessary secondary-storage I/O, instead taking advantage of the fact that the database-management system had already recorded information sufficient to determine that the ordered pair of logical blocks are deduplication candidates.

Step 403 initiates an iterative procedure of steps 403-407. This procedure repeats once for each ordered pair received in step 401. In the description of this iterative procedure, a current ordered pair being processed will be identified as comprising an updated logical block "LogBlock" (originally identified by a log entry in step 305) and a corresponding existing block of the same record "ExistingBlock" (originally identified in step 307 from the ExistingBlock list).

In step 405, the deduplication module searches Table II 5002 (the "Deduplication Table") for an entry associated with updated block LogBlock. This entry identifies a physical block of storage that stores data identified by logical block LogBlock as being updated data that will be written to the updated database record that comprises logical block LogBlock. As shown in FIG. 5, such a record might list an address of the physical block in a "Physical Block" field, and an address of LogBlock in a "Referring Logical Blocks" field.

In step 407, the deduplication module adds an address of ExistingBlock to the Referring Logical Blocks field of the Deduplication Table 5002 entry retrieved in step 405. This addition indicates that both LogBlock and ExistingBlock are now associated with a same physical block. The physical block of the B-Tree 109 that had previously been associated with logical block ExistingBlock is now disassociated from logical block ExistingBlock and that previously associated block may now be freed to be used for other purposes.

In some embodiments, a variation of this method may be performed in which both LogBlock and ExistingBlock are associated with a physical block other than the physical block of the B-Tree 109 that had been previously been associated with logical block ExistingBlock. Although not providing some of the technical advantages of other embodiments described herein, this variation may provide implementation-dependent benefits in certain situations.

In this way, the deduplication module has performed a deduplication that allows both the LogBlock and ExistingBlock logical blocks to refer to a single, common physical block. Furthermore, unlike conventional deduplication methods, this deduplication is accomplished without additional hashing operations, disk I/O, or redundant data copying because the pair of logical blocks to be deduplicated had already been identified and qualified by other database-management modules, such as the Background Tree Constructor 103, as part of their normal operating procedures.

At the conclusion of the final iteration of the iterative procedure of steps 403-407, all LogBlock/ExistingBlock pairs will have been deduplicated and the method of FIG. 4 ends. At this stage, all logical blocks related to logged database transactions and capable of being freed by means of a deduplication procedure will have been deduplicated.

What is claimed is:

1. A database-deduplication optimization system comprising one or more processors, one or more memories coupled to the one or more processors, and one or more computer-readable hardware storage devices coupled to the one or more processors, wherein one or more of the computer-readable hardware storage devices contains program code configured to be run by one or more of the processors via one or more of the memories to implement a method for optimizing deduplication of a database that is stored on a set of database storage devices organized into two or more tiers, the method comprising:

the database-deduplication optimization system retrieving a transaction request from a database log, wherein the transaction request identifies: an existing record stored in the database; a type of transaction to be performed upon the existing record; and an updated data value to be written to the existing record;

the database-deduplication optimization system, in response to the retrieving, identifying a first logical block that corresponds to a first physical block and that stores the updated data value identified by the transaction request;

the database-deduplication optimization system further identifying a second logical block that stores, on a storage device of the set of database storage devices, an existing data value comprised by the existing record; and the database-deduplication optimization system directing a deduplication module to associate the first logical block and the second logical block with a same physical block.

2. The database-deduplication optimization system of claim 1, wherein the same physical block is the first physical block.

3. The database-deduplication optimization system of claim 1, wherein the first logical block and the second logical block are associated with a same tier of the two or more tiers as a function of a first characteristic of the updated data value and of a second characteristic of the existing data value.

4. The database-deduplication optimization system of claim 1, wherein the first characteristic and the second characteristic are selected from a group comprising: an expected frequency with which the updated value will be accessed, an expected type of usage of the updated value, and an importance of the updated value to a user of the database.

5. The database-deduplication optimization system of claim 1, wherein each storage device of the set of database storage devices is associated with a particular tier of the two or more tiers as a function of a characteristic of the each storage device, and wherein the characteristic is selected from a group comprising: a data read time, a data write time, and a storage capacity.

6. The database-deduplication optimization system of claim 1, further comprising:

the database-deduplication optimization system determining that the second logical block identifies sufficient storage capacity to store the updated data value.

7. The database-deduplication optimization system of claim 1, wherein the retrieving the transaction request from the database log, the identifying the first logical block, and the further identifying the second logical block, are performed by accessing only records that are stored in the one or more memories.

8. A method for optimizing deduplication of a database that is stored on a set of database storage devices organized into two or more tiers, the method comprising:

a database-deduplication optimizer retrieving a transaction request from a database log, wherein the transaction request identifies: an existing record stored in the database; a type of transaction to be performed upon the existing record; and an updated data value to be written to the existing record;

the database-deduplication optimizer, in response to the retrieving, identifying a first logical block that corresponds to a first physical block and that stores the updated data value identified by the transaction request;

the database-deduplication optimizer further identifying a second logical block that stores, on a storage device of the set of database storage devices, an existing data value comprised by the existing record; and the database-deduplication optimizer directing a deduplication module to associate the first logical block and the second logical block with a same physical block.

9. The method of claim 8, wherein the same physical block is the first physical block.

10. The method of claim 8, wherein the first logical block and the second logical block are associated with a same tier of the two or more tiers as a function of a first characteristic of the updated data value and of a second characteristic of the existing data value.

11. The method of claim 8, wherein the first characteristic and the second characteristic are selected from a group comprising: an expected frequency with which the updated value will be accessed, an expected type of usage of the updated value, and an importance of the updated value to a user of the database.

12. The method of claim 8, wherein each storage device of the set of database storage devices is associated with a particular tier of the two or more tiers as a function of a characteristic of the each storage device, and wherein the characteristic is selected from a group comprising: a data read time, a data write time, and a storage capacity.

13. The method of claim 8, further comprising:

the database-deduplication optimizer determining that the second logical block identifies sufficient storage capacity to store the updated data value.

14. The method of claim 8, wherein the retrieving the transaction request from the database log, the identifying the first logical block, and the further identifying the second logical block, are performed by accessing only records that are stored in the one or more memories.

15. The method of claim 8, further comprising providing at least one support service for at least one of creating, integrating, hosting, maintaining, and deploying computer-readable program code in the computer system, wherein the computer-readable program code in combination with the computer system is configured to implement the retrieving, identifying, further identifying, and directing.

16. A computer program product, comprising a computer-readable hardware storage device having a computer-readable program code stored therein, said program code configured to be executed by a processor of a computer system to implement a method for optimizing deduplication of a database that is stored on a set of database storage devices organized into two or more tiers, the method comprising:
- a database-deduplication optimizer retrieving a transaction request from a database log, wherein the transaction request identifies: an existing record stored in the database; a type of transaction to be performed upon the existing record; and an updated data value to be written to the existing record;
- the database-deduplication optimizer, in response to the retrieving, identifying a first logical block that corresponds to a first physical block and that stores the updated data value identified by the transaction request;
- the database-deduplication optimizer further identifying a second logical block that stores, on a storage device of the set of database storage devices, an existing data value comprised by the existing record; and
- the database-deduplication optimizer directing a deduplication module to associate the first logical block and the second logical block with the first physical block.

17. The computer program product of claim 16, wherein the first logical block and the second logical block are associated with a same tier of the two or more tiers as a function of a first characteristic of the updated data value and of a second characteristic of the existing data value, and wherein the first characteristic and the second characteristic are selected from a group comprising: an expected frequency with which the updated value will be accessed, an expected type of usage of the updated value, and an importance of the updated value to a user of the database.

18. The computer program product of claim 16, wherein each storage device of the set of database storage devices is associated with a particular tier of the two or more tiers as a function of a characteristic of the each storage device, and wherein the characteristic is selected from a group comprising: a data read time, a data write time, and a storage capacity.

19. The computer program product of claim 16, further comprising:
- the database-deduplication optimizer determining that the second logical block identifies sufficient storage capacity to store the updated data value.

20. The computer program product of claim 16, wherein the retrieving the transaction request from the database log, the identifying the first logical block, and the further identifying the second logical block, are performed by accessing only records that are stored in the one or more memories.

* * * * *